United States Patent

Yamashita et al.

[11] Patent Number: 6,108,547
[45] Date of Patent: Aug. 22, 2000

[54] METHOD FOR CARRYING OUT SOFT HANDOFF IN MOBILE COMMUNICATION SYSTEM, AND MOBILE COMMUNICATION SYSTEM AND BASE TRANSCEIVER STATION FOR IMPLEMENTING THE SAME

[75] Inventors: Atsushi Yamashita; Yoshihiko Asano, both of Kawasaki, Japan

[73] Assignee: Fujitsu Limited, Kanagawa, Japan

[21] Appl. No.: 08/883,830

[22] Filed: Jun. 27, 1997

[30] Foreign Application Priority Data

Nov. 14, 1996 [JP] Japan ................................. 8-303084

[51] Int. Cl.⁷ ........................................ H04Q 7/38
[52] U.S. Cl. ......................... 455/442; 455/436; 455/439
[58] Field of Search ................... 455/438, 432, 455/436, 417, 439, 442, 447, 464, 502, 513, 515, 520, 524, 525, 405, 67.4, 67.6, 550, 561, 552, 553; 370/331, 332, 334, 335, 342, 337, 398

[56] References Cited

U.S. PATENT DOCUMENTS

| 5,418,838 | 5/1995 | Havermans et al. ................... 455/436 |
| 5,483,669 | 1/1996 | Barnee et al. ........................... 455/436 |
| 5,613,211 | 3/1997 | Matsuno ................................... 455/502 |
| 5,682,601 | 10/1997 | Sasuta ..................................... 455/436 |
| 5,729,536 | 3/1998 | Doshi ...................................... 370/398 |
| 5,732,352 | 3/1998 | Gutowski et al. ..................... 455/502 |
| 5,761,619 | 6/1998 | Danne et al. .......................... 455/442 |
| 5,790,528 | 8/1998 | Muszynski .............................. 455/442 |
| 5,799,243 | 8/1998 | Ojaniemi ................................ 455/436 |
| 5,799,252 | 8/1998 | Nakagoshi et al. ................... 455/436 |
| 5,812,949 | 9/1998 | Taketsugu .............................. 455/439 |
| 5,825,760 | 10/1998 | Siira ........................................ 455/442 |
| 5,862,489 | 1/1999 | Aalto ...................................... 455/436 |
| 5,867,785 | 2/1999 | Averbuch et al. ..................... 455/436 |
| 5,926,470 | 7/1999 | Tiedermann, Jr. ..................... 370/335 |

FOREIGN PATENT DOCUMENTS

| 3-82227 | 4/1991 | Japan . |
| WO 91/07020 | 5/1991 | WIPO . |

*Primary Examiner*—Dwayne D. Bost
*Assistant Examiner*—Jean A Gelin
*Attorney, Agent, or Firm*—Helfgott & Karas, P.C.

[57] ABSTRACT

To achieve soft handoff control between base transceiver stations (BTS) served by mobile telephone switching offices (MTSOs), a communication line logically isolated from the MTSOs is provided between adjacent BTSs. Traffic information is transferred between the BTSs via the communication line, thereby achieving a soft handoff with the control taken by one of the BTSs.

24 Claims, 16 Drawing Sheets

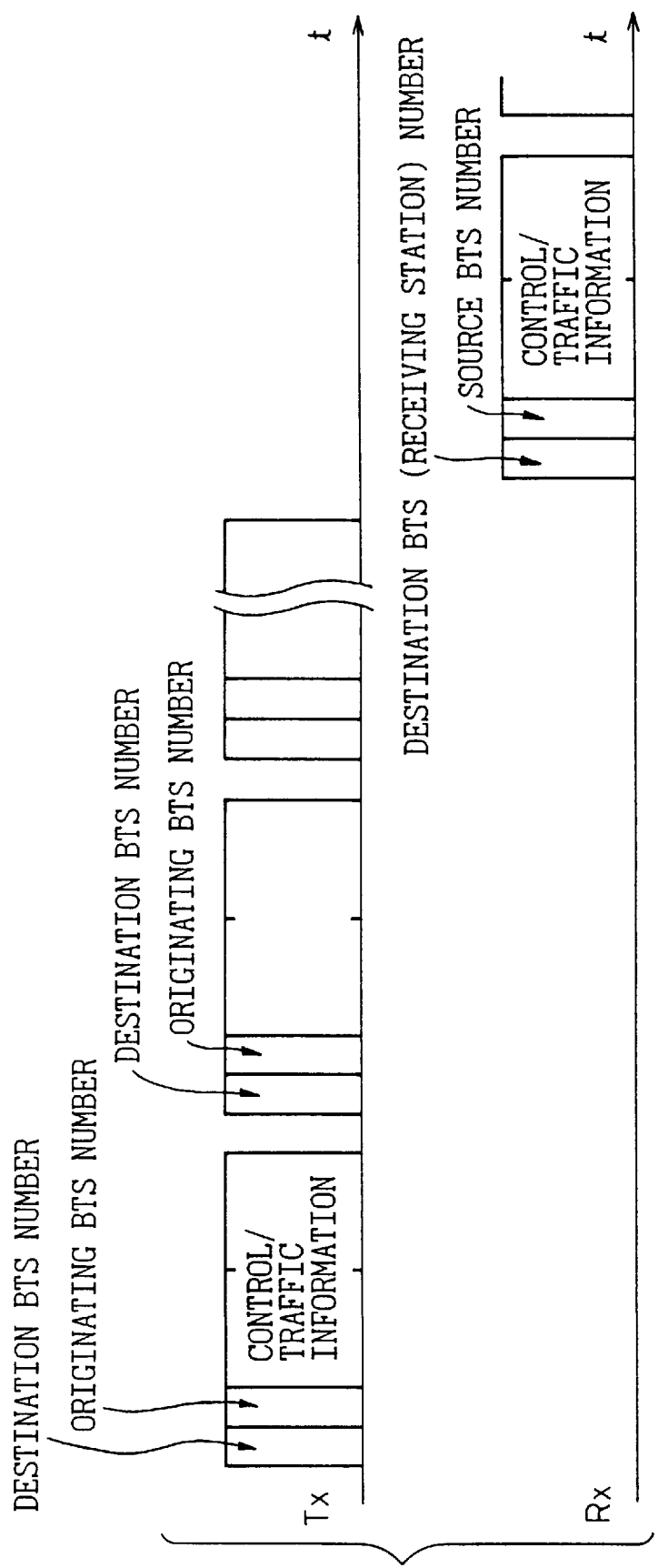

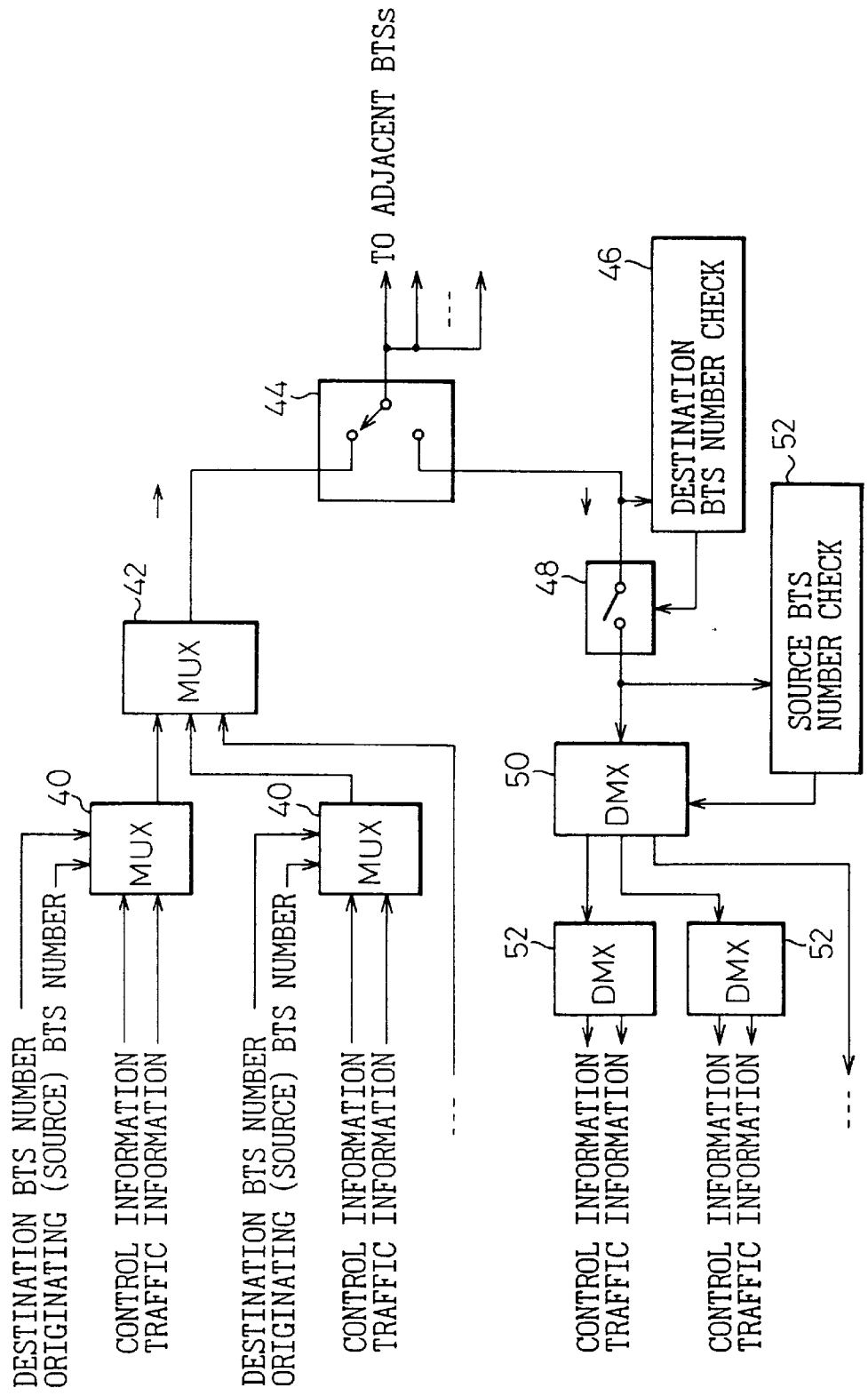

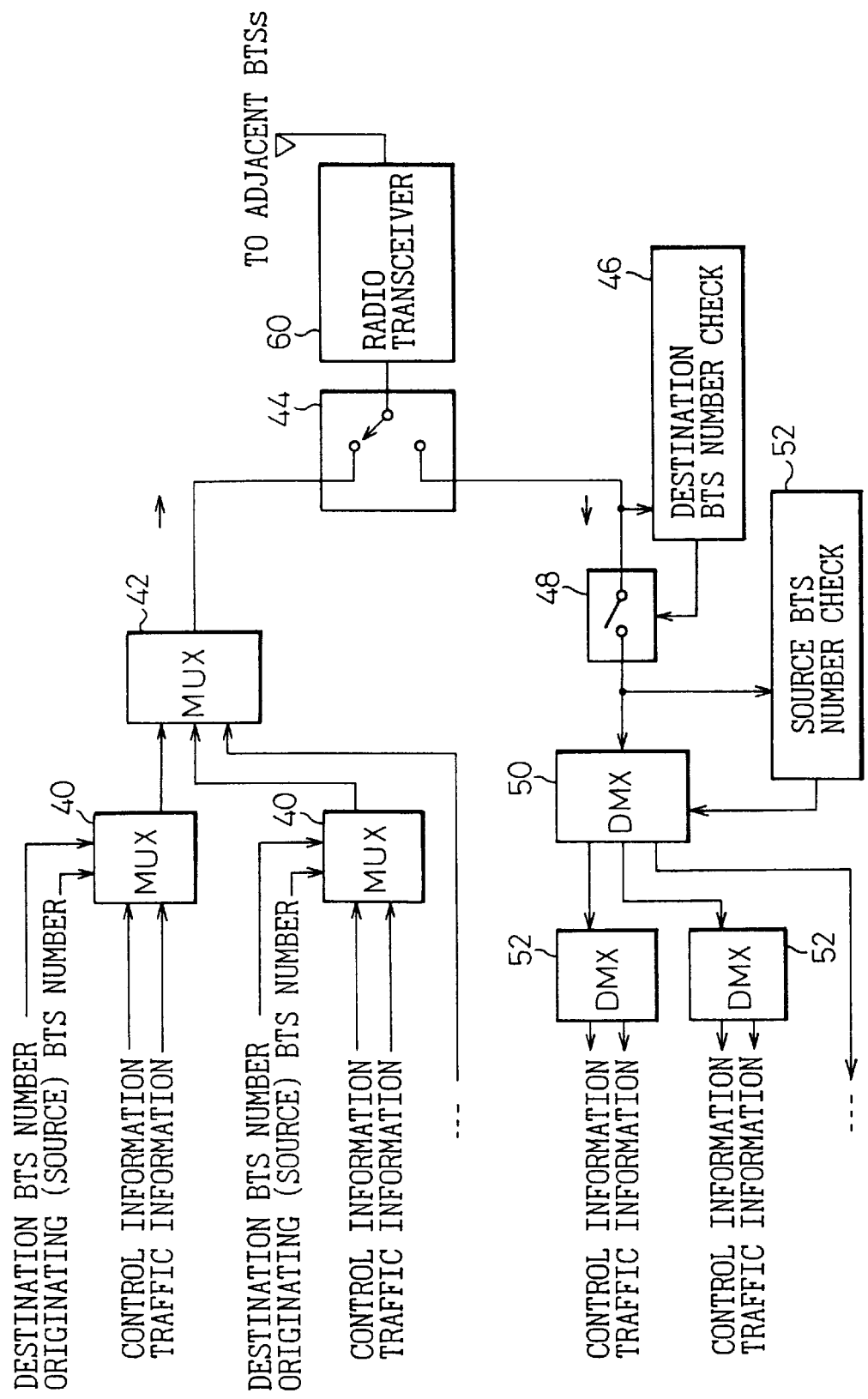

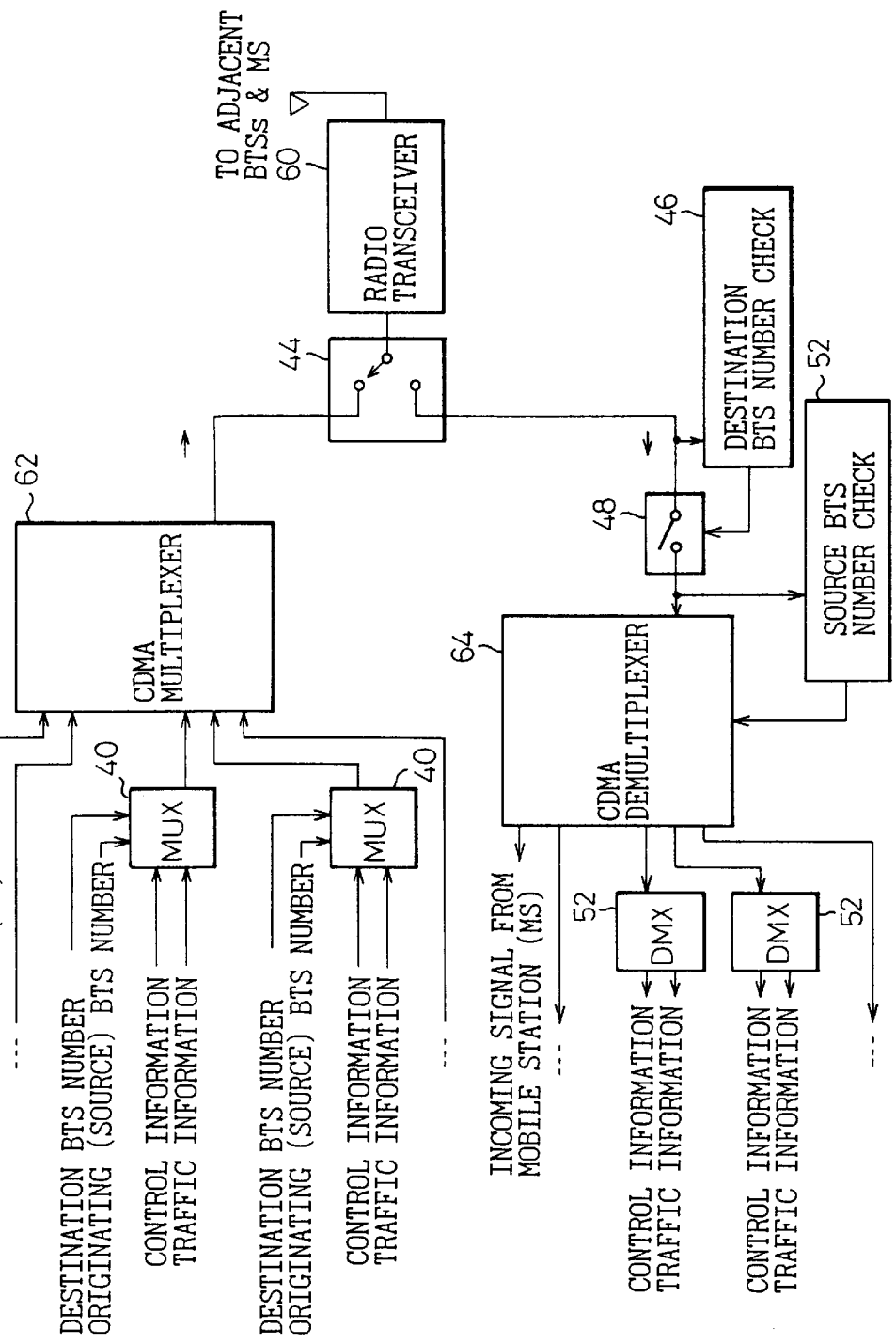

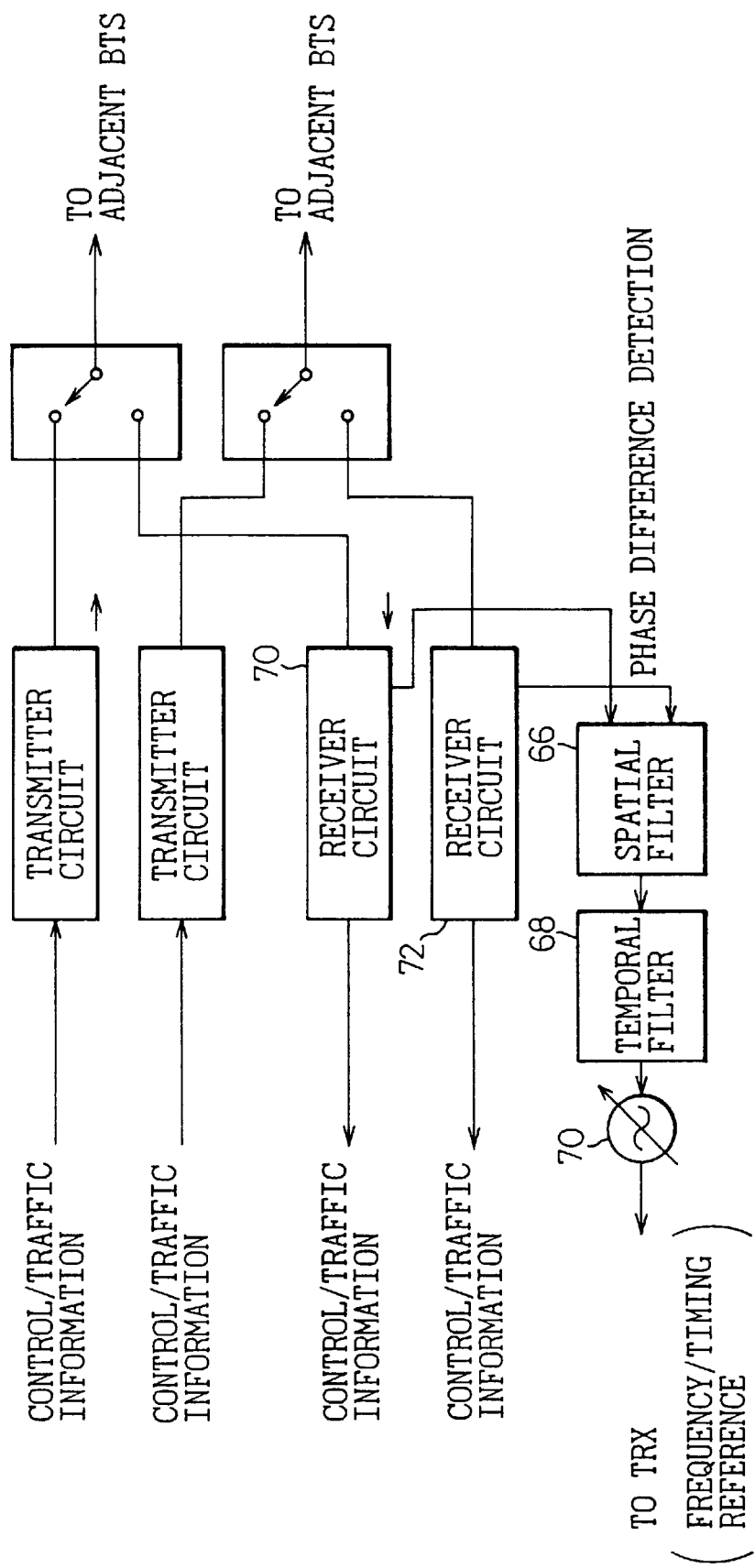

METHOD FOR CARRYING OUT SOFT HANDOFF IN MOBILE COMMUNICATION SYSTEM, AND MOBILE COMMUNICATION SYSTEM AND BASE TRANSCEIVER STATION FOR IMPLEMENTING THE SAME

BACKGROUND OF THE INVENTION

1. Field of the Invention

The present invention relates to a method for carrying out a soft handoff in a cellular mobile communication system, and a system and a base transceiver station for implementing the same.

2. Description of the Related Art

In a cellular mobile communication system, radio channel switching control performed when a mobile unit (car telephone, portable telephone, etc.) moves from one cell into another cell is known as handoff. One handoff control method is the so-called soft handoff technique.

While the process of ordinary handoff (sometimes called hard handoff as opposed to soft handoff) involves disconnecting the radio link in the first cell upon initiation of a handoff and then establishing a radio link with the second cell, the soft handoff process is characterized by establishing a radio link with the second cell while maintaining the radio link with the first cell (that is, radio links to two (or more) cells are operating simultaneously). This handoff technique is often used, among others, in code division multiple access (CDMA) systems (Japanese Unexamined Patent Publication No. 4-502845). The soft handoff technique offers the following advantages (Japanese Patent Unexamined Publication No. 4-502845).

(1) Uninterrupted handoff is possible.

Unlike hard handoff, no interruptions occur during a conversation, etc. when a handoff takes place.

(2) Inter-cell diversity is possible.

Generally, radio communication quality deteriorates near cell boundaries, but maintaining simultaneous communications with more than one cell by soft handoff serves to achieve inter-cell diversity, providing increased resistance to shadowing and fading.

Generally, the advantage (1) is receiving attention as the strong point of soft handoff, but in practice, as is apparent from the analysis conducted by A. J. Viterbi et al. (A. J. Viterbi and A. M. Viterbi, "Other-Cell Interface in Cellular Power-Controlled CDMA," IEEE Trans. on Commun., Vol. 42, No. 2/3/4 (1994)), soft handoff is an essential technique for CDMA where transmission power control is performed, since, without soft handoff, interference with other cells would become extremely large, substantially reducing the number of available radio channels (the number of subscribers that can be served). If "improving service quality" as exemplified by the advantage (1) were a primary consideration, whether to use or not use soft handoff could be determined at discretion, but the fact that soft handoff is an essential technique means that soft handoff must be carried out as simply as possible and at low cost.

Previous systems have had the following problems since soft handoff and inter-cell diversity are both controlled centrally at a mobile telephone switching office (MTSO) (or a base station controller (BSC); an MTSO or a BSC can be called a concentrator).

(1) Since a soft handoff to a base transceiver station (BTS) served by a different concentrator is not possible,.if a handoff to a BTS served by a different concentrator occurs, quality deterioration and inter-cell interference increase because of a momentary interruption and an inability to provide inter-cell diversity, leading to substantial degradation in system performance.

(2) The system, and particularly the concentrator, becomes extremely complex and expensive.

That is, to obtain a sufficient soft handoff effect, and to avoid a handoff involving different concentrators such as described in (1) as much as possible, a large number of BTSs must be accommodated under one concentrator. Furthermore, according to A. J. Viterbi et al., during the execution of a soft handoff each mobile station (MS) needs to be connected simultaneously to at least two BTSs, and for inter-cell diversity, three to four BTSs. This greatly increases the processing capability demanded of the concentrator. The concentrator thus increases in size, complexity, and cost. Additionally, cost reductions by mass production cannot be expected in the case of concentrators since the number of concentrators installed is small. Moreover, since a failure of one concentrator could lead to communication failures of the large number of BTSs (cells) under the control of that concentrator, high reliability is demanded, pushing the cost of the concentrator further upward.

SUMMARY OF THE INVENTION

An object of the present invention is to provide a method for carrying out a soft handoff which overcomes the above-outlined problems, and a system and a base transceiver station for implementing the same.

According to the present invention, there is provided, in a mobile communication system that includes a concentrator and base transceiver stations connected thereto, a method for carrying out a soft handoff between a mobile station and multiple base transceiver stations, comprising the steps of: connecting in advance adjacent base transceiver stations via a communication line logically isolated from the concentrator; and performing soft handoff control between the mobile station and the multiple base transceiver stations by using said communication line with the control taken by one of the multiple base transceiver stations.

According to the present invention, there is also provided a mobile communication system comprising: a concentrator; base transceiver stations connected to the concentrator; a communication line, logically isolated from the concentrator, for connecting between adjacent base transceiver stations; and means, provided in each of the base transceiver stations, for performing soft handoff control between the mobile station and multiple base transceiver stations by using the communication line with the control taken by one of the multiple base transceiver stations.

According to the present invention, there is also provided a base transceiver station for a mobile communication system that includes a concentrator and base transceiver stations connected thereto, comprising: means for communicating with adjacent base transceiver stations via a communication line logically isolated from the concentrator; and means for performing soft handoff control between a mobile station and multiple base transceiver stations by using the communication line with the control taken by one of the multiple base transceiver stations.

According to the present invention, since each base transceiver station performs soft handoff control by using the communication line provided between adjacent base transceiver stations, the concentrator is simple in construction and low cost. Furthermore, if a failure occurs in soft handoff control at a base transceiver station, the failure does not spread beyond the base transceiver stations adjacent to the failed station. This increases the system's overall reliability. Control circuitry of each base transceiver station increases in complexity, but since control involves processing only between several adjacent base transceiver stations, the increase in complexity is less of an issue compared to that of concentrators in previous systems. Furthermore, the large number of base transceiver stations installed provides advantages in terms of cost reductions by mass production.

BRIEF DESCRIPTION OF THE DRAWINGS

FIG. 10 is a diagram showing an example of a multiplexed signal in another embodiment of the present invention;

FIG. 11 is a block diagram showing one example of a circuit configuration for multiplexing and demultiplexing;

FIG. 16 is a diagram showing a further embodiment of the present invention;

FIG. 17 is a diagram showing a further embodiment of the present invention; and

FIG. 18 is a diagram showing a further embodiment of the present invention.

DESCRIPTION OF THE PREFERRED EMBODIMENTS

Figure 1:
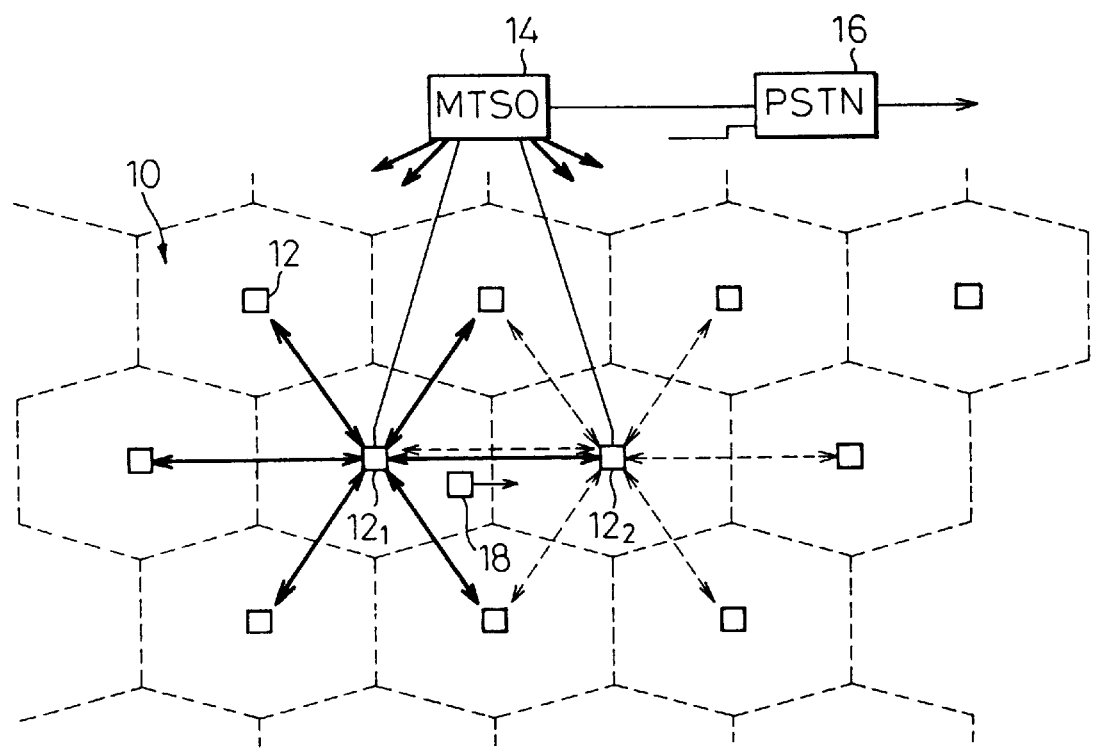
FIG. 1 is a diagram showing in schematic form the configuration of a cellular mobile communication system according to the present invention.

FIG. 1 shows in schematic form the configuration of a cellular mobile communication system according to the present invention. As shown in FIG. 1, the mobile communication service area is divided into a plurality of cells 10 in each of which a base transceiver station (BTS) 12 is provided. Each BTS 12 is connected to a public switched telephone network (PSTN) 16 via a mobile telephone switching office (MTSO) 14. In FIG. 1 and in the description hereinafter given, each cell is shown as a hexagonal cell with six cells adjacent to it, but in reality, the cells can be configured in different shapes depending on the geography and radio wave propagation characteristics. In some configurations, one cell is divided into a plurality of sectors, but in any case, the essential functions of the system are the same though the number of adjacent cells, etc. may differ.

As shown in FIG. 1, each BTS 12 is linked to its adjacent BTSs so that control information and traffic information can be transferred to and from the adjacent BTSs. Here, the control information refers to information for soft handoff control between BTSS, while the traffic information refers to information such as user data and control information transferred to and from the MTSO, which would ordinarily be transferred directly between each BTS and the MTSO. In FIG. 1, connections only for the BTS $12_1$ and BTS $12_2$ are shown, but connections for other BTSs are essentially the same.

The process of soft handoff performed in the system of FIG. 1 according to the present invention will be described below with reference to the signal sequence diagram of FIG. 2, by taking an example in which a mobile station (MS) 18 moves from the cell covered by the BTS $12_1$ into the cell covered by the BTS $12_2$.

Figure 2:
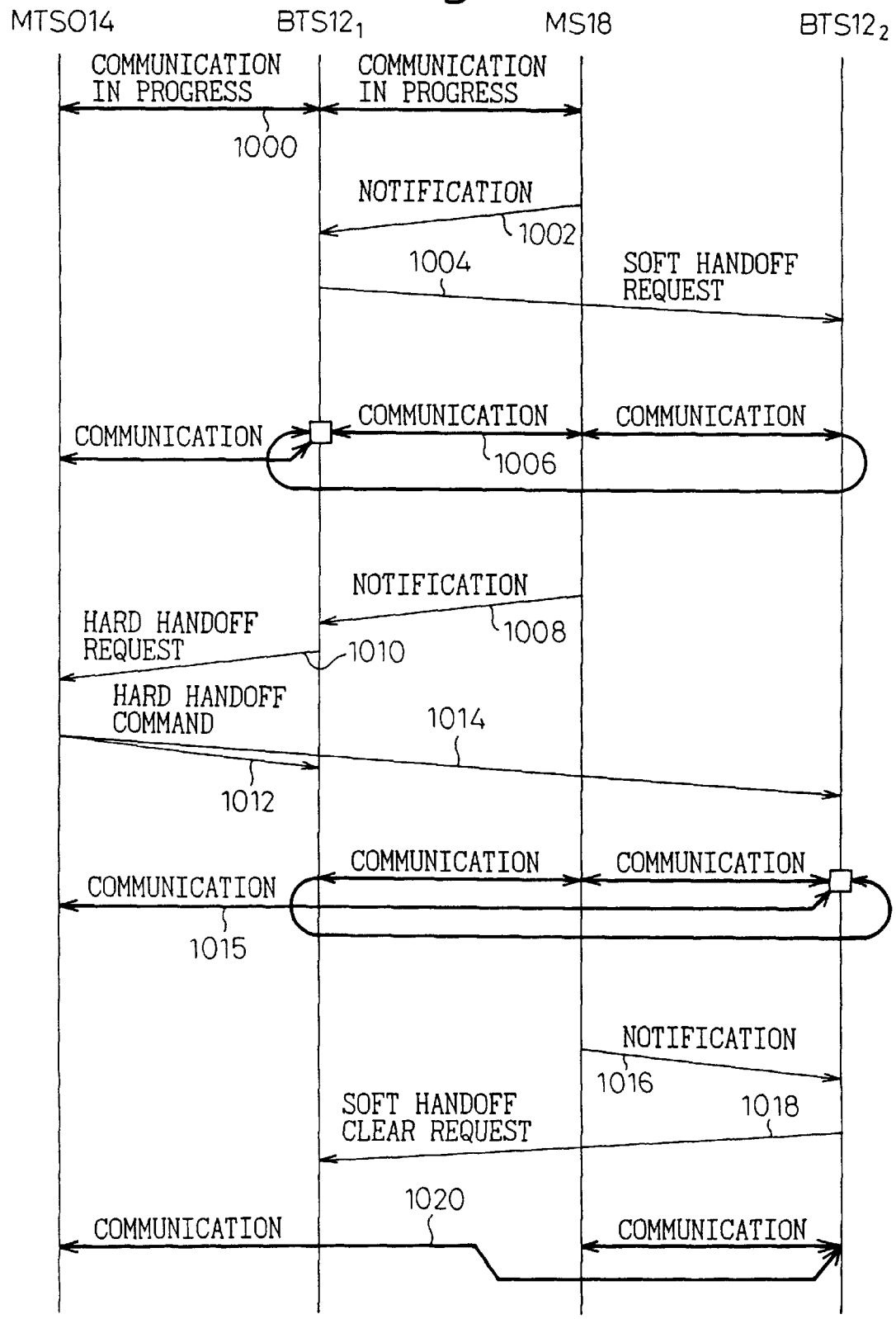
FIG. 2 is a signal sequence diagram illustrating a soft handoff procedure according to the present invention.

In step 1000 in FIG. 2, the MS 18 is connected to the PSTN 16 (FIG. 1) via the BTS $12_1$ and the MTSO 14, and is in the process of a voice communication in normal communication mode.

When the MS 18 detects that the quality of the channel between the MS 18 and BTS $12_1$ has deteriorated and that the quality with the BTS $12_2$ has improved, the MS 18 notifies the BTS $12_1$ accordingly (step 1002), upon which a transfer is made to a soft handoff mode. Usually, the channel quality can be detected by the MS by measuring the signal strength of the control channel that is constantly received from each BTS, but this can also be accomplished by using other means (for example, by measuring bit error rate). The BTS $12_1$ requests the BTS $12_2$ to initiate a soft handoff (step 1004) and establish a radio channel (a spreading code in the case of CDMA). Here, it is also possible to establish radio channels to more than two stations, instead of just two stations. If there are no unused channels available in the BTS $12_2$ at this time, the soft handoff fails, which is the case not only with the prior art method but also with the method of the present invention.

If there is an unused channel available in the BTS $12_2$, the soft handoff mode under the control of BTS $12_1$ is entered in step 1006 with the MS 18 connected to both the BTS $12_1$ and BTS $12_2$ simultaneously (simultaneous connection to three or more BTSs are also possible). At this point in time, the MTSO still recognizes that the MS is connected to the BTS $12_1$. Therefore, forward traffic information is sent from the MTSO to the BTS $12_1$ and then transmitted from the BTS $12_1$ onto its radio channel. At the same time, the forward traffic information is also transferred from the BTS $12_1$ to the BTS $12_2$ and then transmitted from the BTS $12_2$ onto its radio channel. The MS 18 performs diversity reception, such as selective combining or maximal-ratio combining, on the signals from the BTS $12_1$ and BTS $12_2$. In selective combining, only the signal with better channel quality is selected, while in maximal-ratio combining, the signals are combined in the proportions appropriate to the channel quality. Reverse traffic information is transmitted from the MS 18 and received by the BTS $12_1$ and BTS $12_2$. The BTS $12_2$ transfers the traffic information (with channel quality information, etc. appended to it) to the BTS $12_1$ which then performs inter-cell diversity processing and sends the information on to the MTSO 14.

When the MS 18 detects that the quality of the channel with the BTS $12_1$ has deteriorated and that the quality of the channel with the BTS $12_2$ has improved sufficiently, the MS 18 notifies the BTS $12_1$ accordingly (step 1008), upon which control of the soft handoff mode is transferred from the BTS $12_1$ to the BTS $12_2$. More specifically, the BTS $12_1$ sends a handoff request to the MTSO 14 (step 1010), in response to which the MTSO 14 issues a handoff command to the BTS $12_1$ and BTS $12_2$ (steps 1012, 1014). At this point in time, the MTSO 14 recognizes that a handoff from the BTS $12_1$ to the BTS $12_2$ has occurred.

The soft handoff mode under the control of the BTS $12_2$ is essentially the same as the soft handoff mode under the control of the BTS $12_1$, except that the BTS $12_2$ takes control and performs inter-cell diversity processing in place of the BTS $12_1$ (step 1015).

After that, when the quality of the channel with the BTS $12_1$ has deteriorated far enough, the soft handoff mode is terminated (steps 1016, 1018), and a transfer is made to the normal communication mode in which the MS 18 is connected only to the BTS $12_2$ (step 1020).

When there occurs a handoff between BTSs served by different MTSOs, soft handoff is carried out following the same procedure; in that case also, since the radio channels remain connected during the soft handoff mode in steps 1006 to 1014, degradation in system performance does not occur that could result from quality degradation and increased inter-cell interference due to a momentary interruption and an inability to provide inter-cell diversity.

Figure 3:
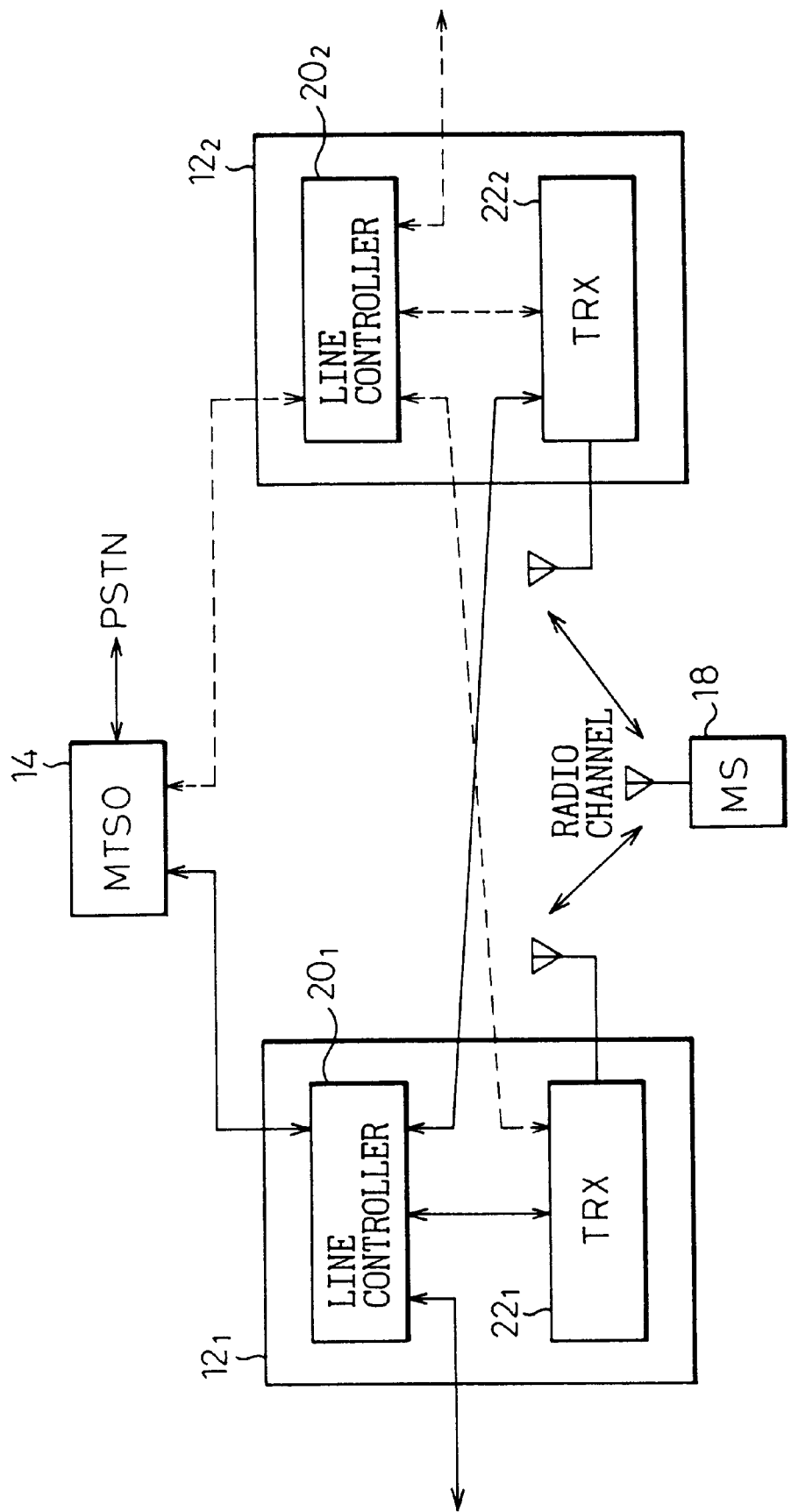
FIG. 3 is a schematic diagram showing connections in a soft handoff mode.

FIG. 3 is a schematic diagram showing connections in the soft handoff mode. In FIG. 3, the BTSs $12_1$ and $12_2$ are equipped with line controllers $20_1$ and $20_2$ and transceivers (TRXs) $22_1$ and $22_2$, respectively. In the soft handoff mode under the control of the BTS $12_1$, connections are formed in the BTSs $12_1$ and $12_2$, as shown by solid lines in FIG. 3, and the forward traffic information received by the BTS $12_1$ from the MTSO 14 is sent to the MS 18 via the line controller $20_1$, TRX $22_1$, and radio channel. At the same time, the same traffic information is transferred from the line controller $20_1$ to the TRX $22_2$ in the BTS $12_2$ and also the TRXs (not shown) in other adjacent BTSs, and transmissions are made from the BTS $12_2$ and other adjacent BTSs to the MS 18. The MS 18 performs diversity reception on the signals from the BTS $12_1$, BTS $12_2$, and other BTSs. The reverse traffic information from the MS 18 is received by the TRXs $22_1$, $22_2$ in the BTSs $12_1$, $12_2$ and the TRXs in other adjacent BTSs, and all the received signals are collected by the line controller $20_1$ for diversity control. In the soft handoff mode under the control of the BTS $12_2$, connections are formed as shown by dotted lines in FIG. 3, and the role is exchanged between the BTS $12_1$ and BTS $12_2$.

Figure 4:
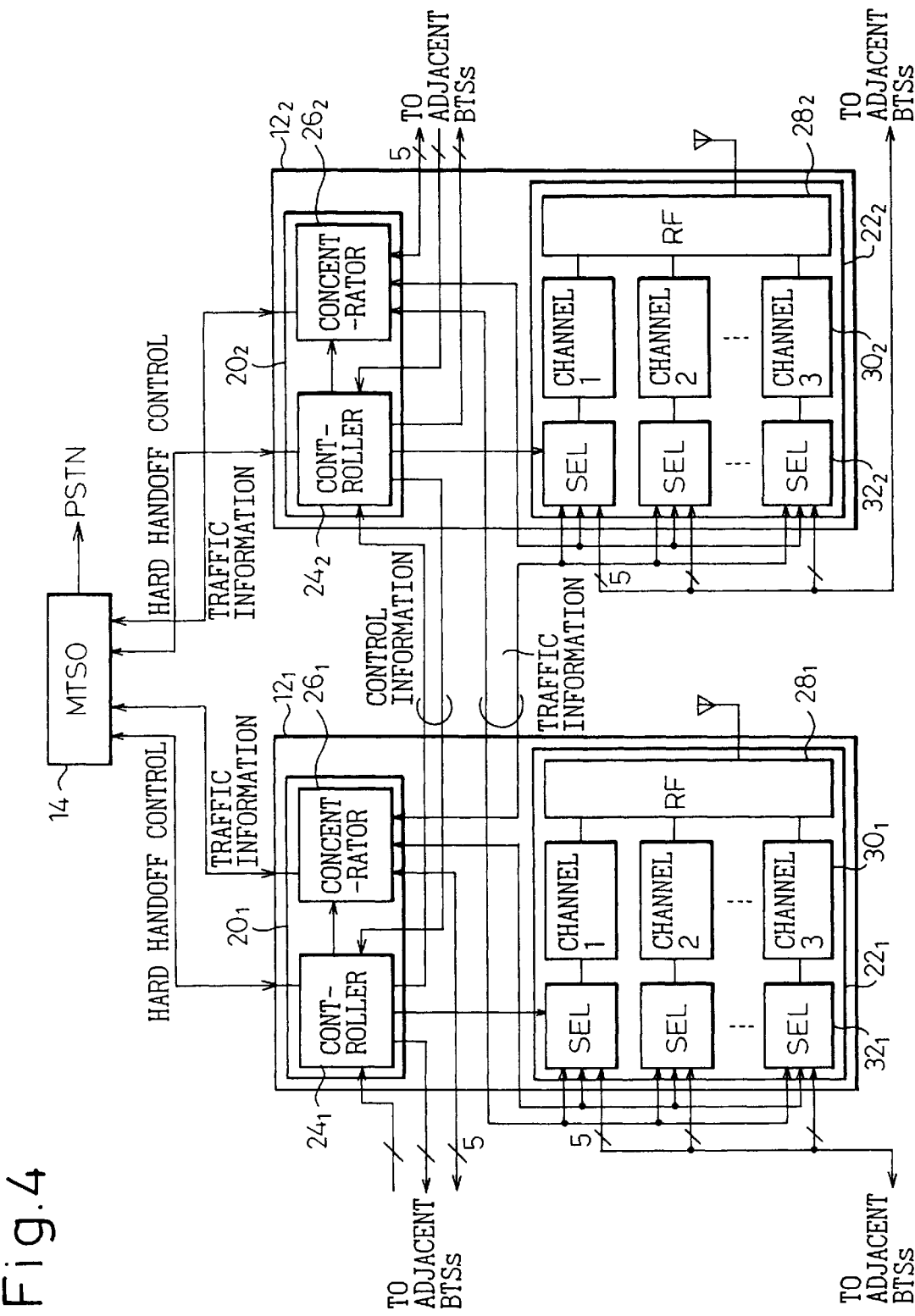
FIG. 4 is a block diagram showing the detailed configuration of a BTS.

FIG. 4 shows the detailed configuration of the BTSs $12_1$ and $12_2$. The line controllers $20_1$ and $20_2$ include controllers $24_1$ and $24_2$ and concentrators $26_1$ and $26_2$, respectively. The controllers $24_1$ and $24_2$ are each implemented using, for example, a microcomputer. The concentrators $26_1$ and $26_2$ are responsible for distribution of the forward traffic information and diversity control of the reverse traffic information in the soft handoff mode under the control of the respective BTSs.

The TRXs $22_1$ and $22_2$ include radio frequency (RF) modules $28_1$ and $28_2$, baseband processors $30_1$ and $30_2$ for respective channels, and selectors (SELs) $32_1$ and $32_2$. Each of the selectors $32_1$ and $32_2$, provided one for each channel, selects one connection, under the control of the controller $24_1$ or $24_2$, from among the connections to the concentrator $32_1$ or $32_2$ in the same BTS, the concentrator $32_2$ or $32_1$ in the adjacent BTS, and the concentrators in other adjacent BTSs (not shown), and assigns a radio channel to the selected BTS.

Figure 5:
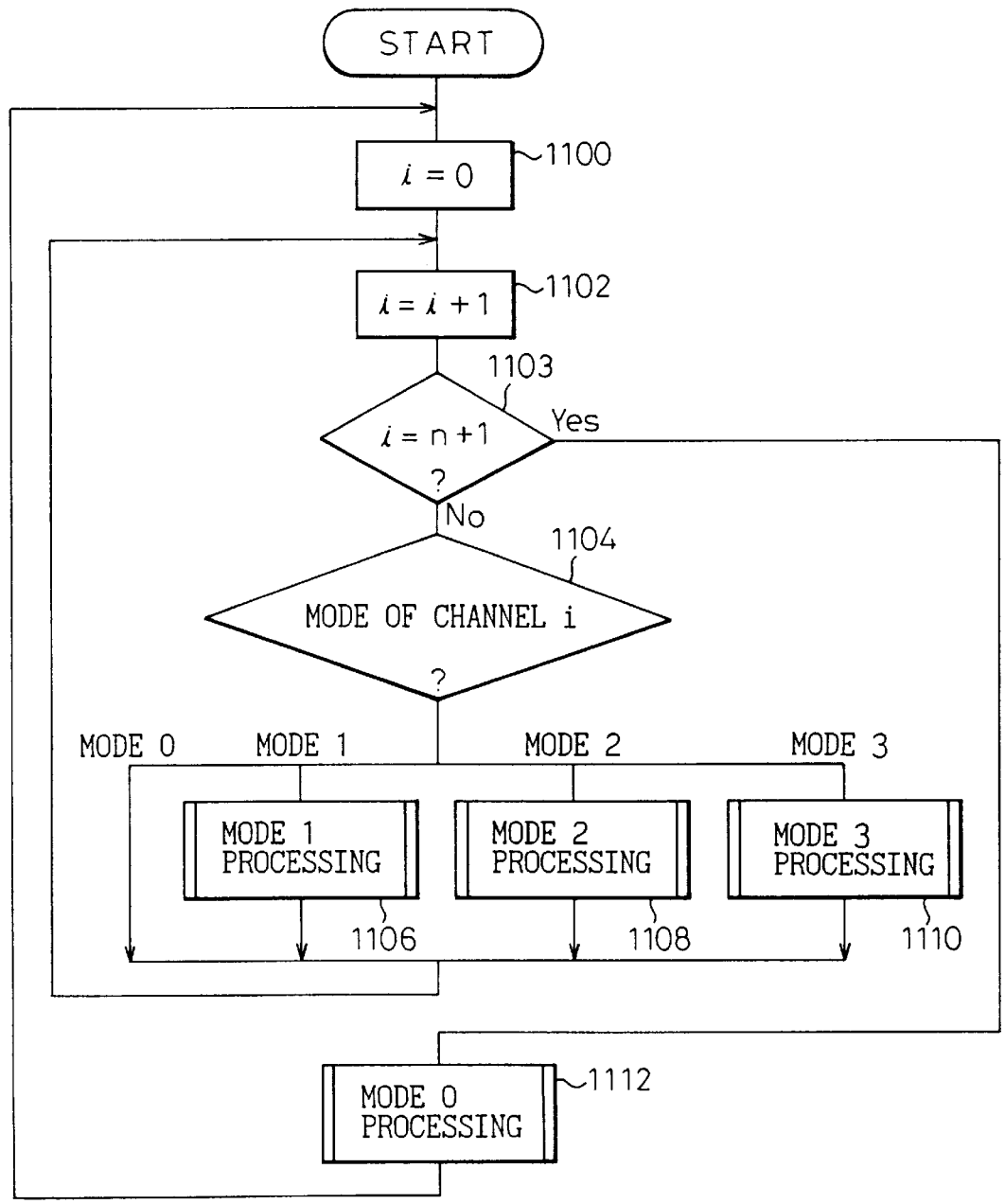
FIG. 5 is a flowchart showing an outline of a controller operation in the BTS in the soft handoff procedure according to the present invention.
Figure 6:
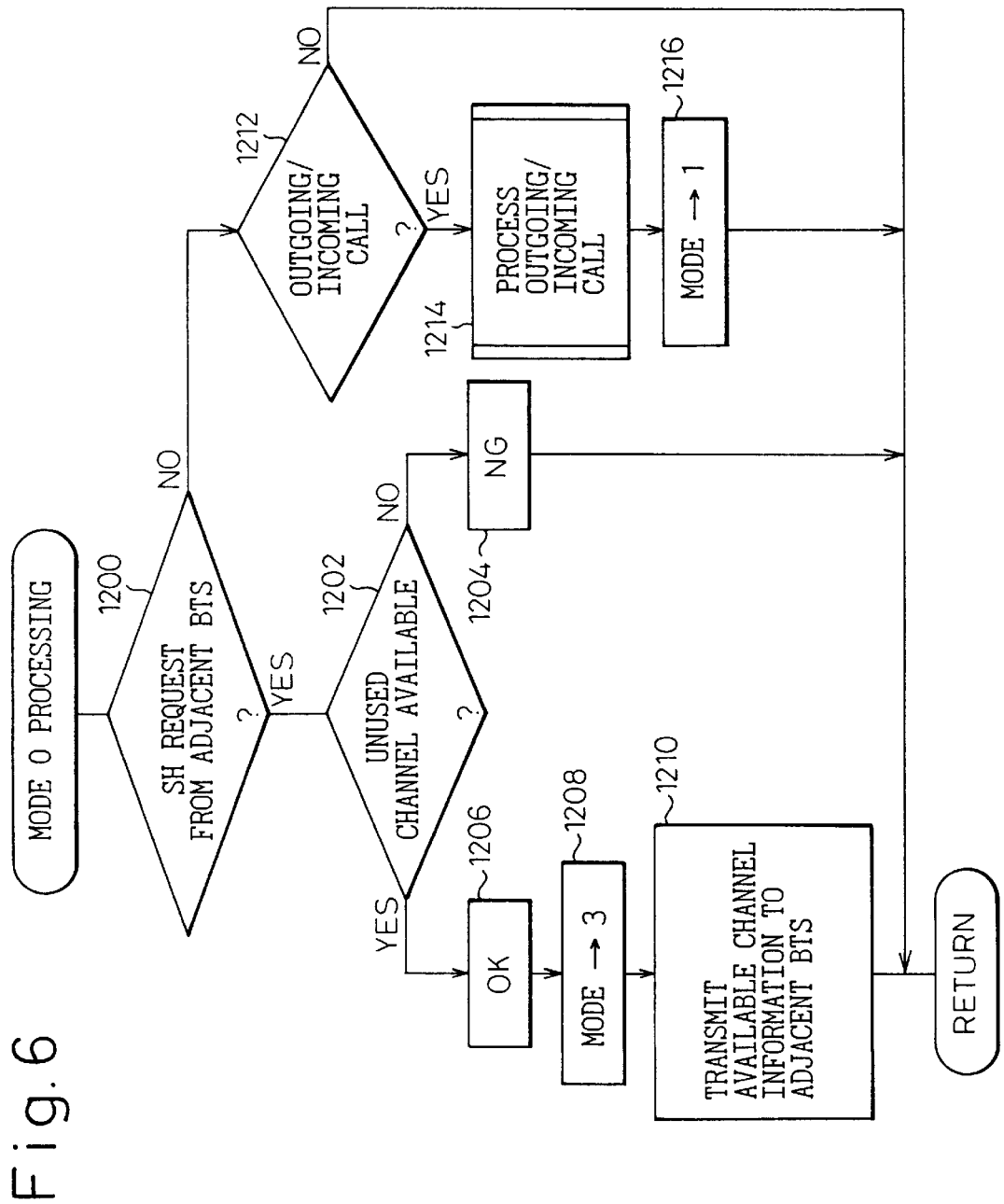
FIG. 6 is a flowchart illustrating the detail of mode 0 processing.
Figure 7:
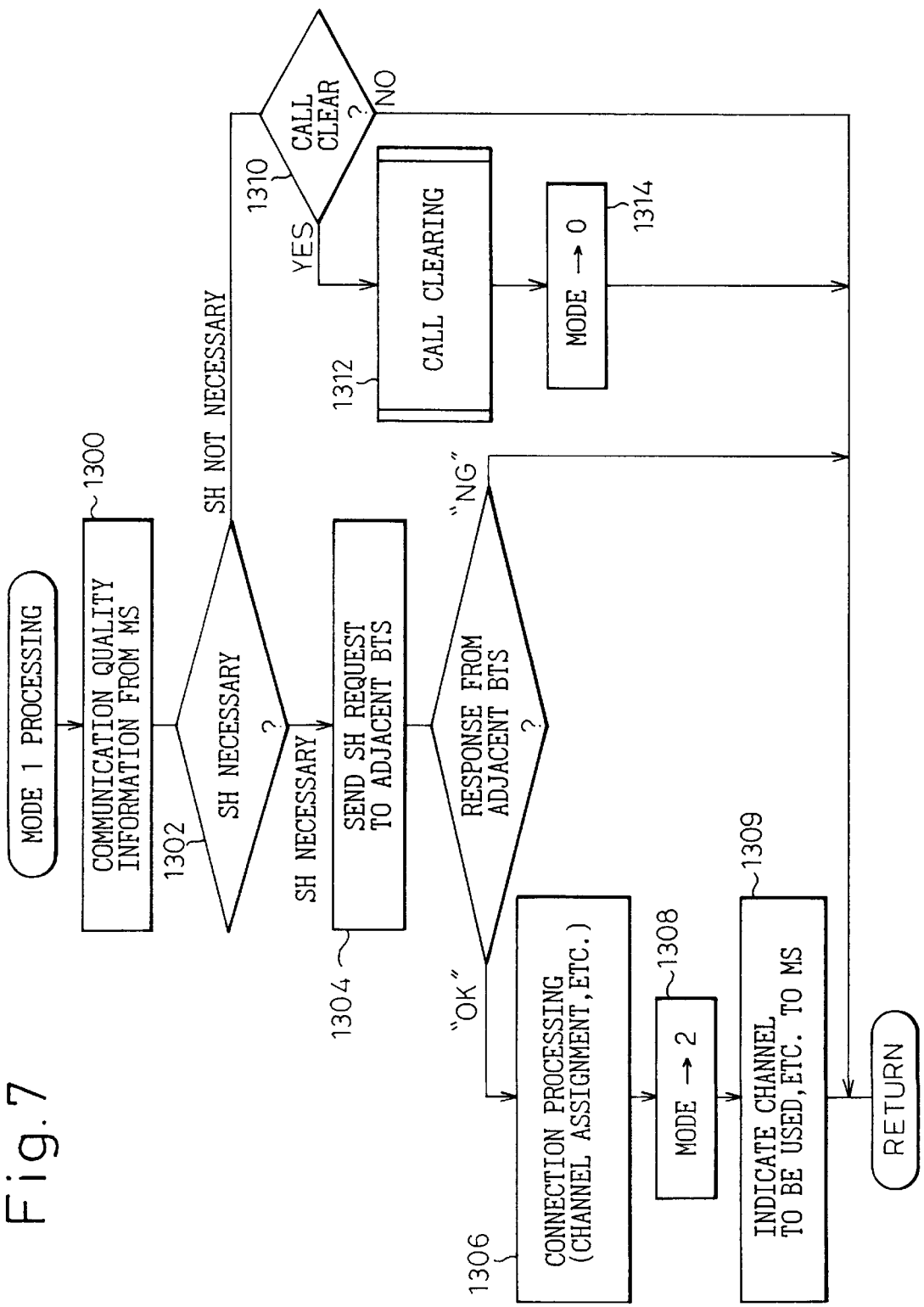
FIG. 7 is a flowchart illustrating the detail of mode 1 processing.
Figure 8:
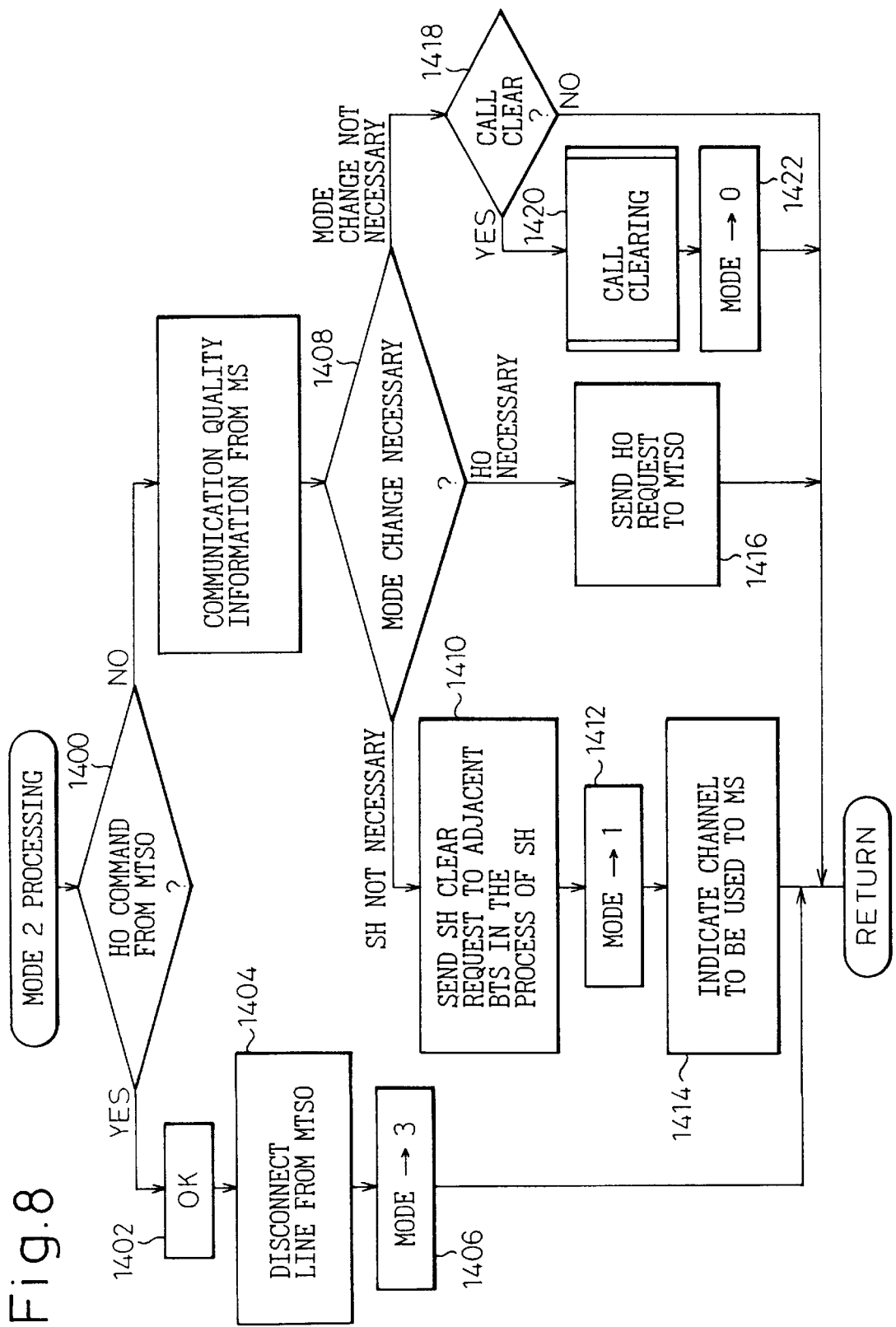
FIG. 8 is a flowchart illustrating the detail of mode 2 processing.
Figure 9:
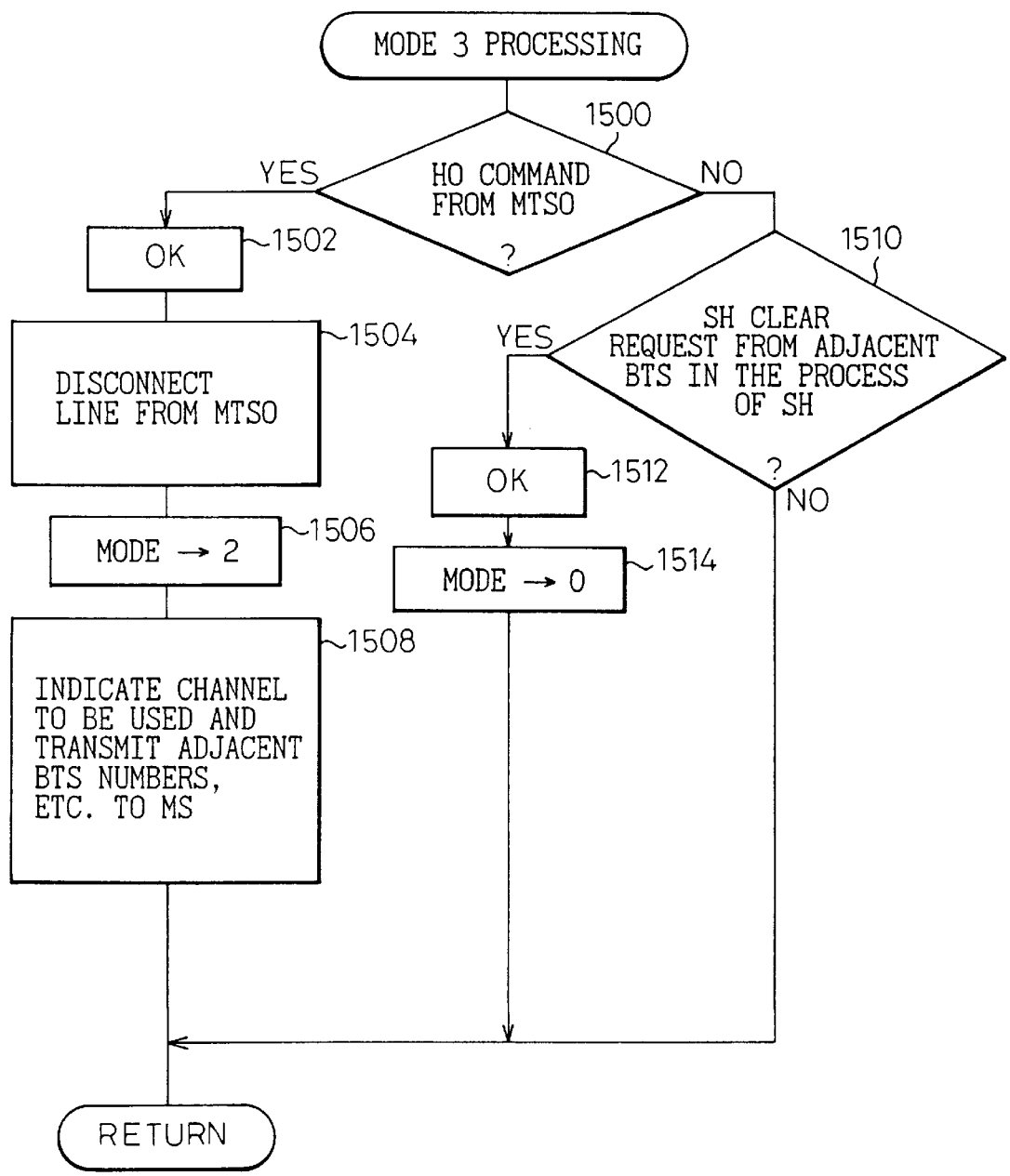
FIG. 9 is a flowchart illustrating the detail of mode 3 processing.

The operation of the controller 24 will be described with reference to the flowcharts shown in FIGS. 5 to 9. FIG. 5 shows an outline of the operation of the controller 24; FIG. 6 shows a processing procedure for a channel in an unused state (mode 0); FIG. 7 shows a processing procedure for a channel in a mode (mode 1) in which that channel alone is connected to the MS; FIG. 8 shows a processing procedure for a channel in a soft handoff mode under the control of the BTS itself (mode 2); and FIG. 9 shows a processing procedure for a channel in a soft handoff mode under the control of an adjacent BTS (mode 3).

In FIG. 5, 0 is substituted for parameter i (step 1100), the parameter is incremented by 1 (step 1102), and if i is not equal to n+1 (step 1103), the mode of the channel i is checked (step 1104). If the mode is 1, 2, or 3, processing corresponding to the mode 1, 2, or 3 is performed (step 1106, 1108, or 1110), and the process returns to step 1102. If the mode is 0, the process immediately returns to step 1102. If i is equal to n+1 in step 1103, processing of mode 0 is performed (step 1112), and the process returns to step 1100.

In the processing of mode 0 in FIG. 6, first a decision is made as to whether there is a soft handoff request from an adjacent BTS (step 1200). If there is a soft handoff request from an adjacent BTS (a situation corresponding to step 1004 in FIG. 2), then a decision is made as to whether there is an unused channel available (step 1202). If there are no unused channels available, a reject response is returned in response to the soft handoff request (step 1204), and the process is terminated. If there is an unused channel, a response informing that the soft handoff request is accepted is returned (step 1206), and the mode of that channel is changed to mode 3, with the selector 32 (FIG. 4) for the same channel now connected to the line to the adjacent BTS (step 1208). Then, information on the channel available for the soft handoff is transmitted to the adjacent BTS (step 1210). Consequently, the forward traffic information received from the adjacent BTS is transmitted to the BS as the radio frequency signal on that channel, and the reverse traffic information received from the MS as the radio frequency signal on that channel is transferred to the adjacent BTS. On the other hand, if it is decided in step 1200 that there is no soft handoff request from the adjacent BTS, then a decision is made as to whether there is an outgoing call or incoming call (step 1212); if there is an outgoing call or incoming call request, usual outgoing call or incoming call processing is performed (step 1214), and the mode of the assigned channel is changed to mode 1 (step 1216). Consequently, the forward traffic information from the MTSO is transmitted to the MS, and the reverse traffic information from the MS is transmitted to the MTSO.

In the processing of mode 1 in FIG. 7, first a decision is made as to whether a soft handoff is necessary, based on the communication quality information received from the MS (step 1302). If it is decided that a soft handoff is necessary, a soft handoff request is sent to an adjacent BTS (step 1304). If the response from the adjacent BTS is "OK", diversity reception is performed between the reverse traffic information received through the line from the adjacent BTS and the reverse traffic information received by the BTS itself, while at the same time, the connection within the concentrator 26 (FIG. 4) is set so that the forward traffic information received from the MTSO can also be transferred to the adjacent BTS (step 1306), the mode of the channel is changed to mode 2 (step 1308), and the channel to be used for the soft handoff, etc. is indicated to the MS (step 1309). If it is decided in step 1302 that there is no need for a soft handoff, a decision is then made as to whether a call clear request is made (step 1310). If there is a call clear request, call clearing is performed, and the mode of that channel is changed to mode 0 (step 1314).

In the processing of mode 2 in FIG. 8, a decision is made in step 1400 as to whether a hard handoff command (step 1012 in FIG. 2) is issued from the MTSO. If there is a hard handoff command from the MTSO, then an "OK" response is returned (step 1402), the line with the MTSO is disconnected with the connection changed to that in mode 3 previously described (step 1404), and the mode of the channel is changed to mode 3. If, in step 1400, there is no hard handoff command from the MTSO, a decision is made, based on the communication quality information received from the MS, as to whether there is a need to change mode (step 1408). If the communication quality improves enough that the soft handoff is no longer needed, in step 1410 a soft handoff clear request is sent to the adjacent BTS that is in the process of the soft handoff, the mode of the current channel is changed to mode 1 (step 1412), and the channel to be used in mode 1 is indicated to the MS (step 1414). If, in step 1408, it is decided that there has arisen a need to carry out a hard handoff and to transfer control of the soft handoff to the adjacent BTS because the communication quality of the current BTS has deteriorated and the quality of the adjacent BTS has improved, then in step 1416 a hard handoff request is sent to the MTSO. If, in step 1408, it is decided that there is no need to change mode, then in step 1418 a decision is made as to whether a call clear request is made; if there is a call clear request, call clearing is performed (step 1420), and the mode of the channel is changed to mode 0 (step 1422).

In the processing of mode 3 in FIG. 9, first a decision is made as to whether a hard handoff command is issued from the MTSO (step 1500); if there is a hard handoff command from the MTSO, an "OK" response is returned (step 1502), the line with the MTSO is connected (step 1504), the mode of the current channel is changed to mode 2 (step 1506), and information on the channel to be used, adjacent BTS numbers, etc. is transmitted to the MS (step 1508). If, in step 1500, there is no hard handoff command from the MTSO, then a decision is made as to whether a soft handoff clear request is issued from the adjacent BTS that is in the process of the soft handoff (step 1510). If there is a soft handoff clear request, an "OK" response is returned, and the mode of the channel is changed to mode 0.

In the embodiment shown in FIG. 4, adjacent BTSs are interconnected by respectively independent communication lines, and the bidirectional control information and traffic information also are transmitted over respectively independent communication lines; therefore, a large number of lines are required between adjacent BTSs. In another embodiment of the present invention hereinafter described, the number of lines between BTSs is reduced by multiplexing control information and traffic information for different destinations and/or sources, as shown in FIG. 10.

FIG. 11 shows the configuration of a circuit provided in each BTS for multiplexing and demultiplexing multiplexed signals of the format shown in FIG. 10. In FIG. 11, control information and traffic information for each destination are multiplexed in a multiplexer 40 with the destination BTS number and the originating (source) BTS number in accordance with the signal format shown in FIG. 10, and they are further multiplexed in a multiplexer 42 in accordance with the signal format shown in FIG. 10, for transmission to adjacent BTSs via a transmit/receive select switch 44.

Signals received from adjacent BTSs are input via the transmit/receive select switch 44 and fed to a destination BTS number check circuit 46 where the destination BTS number is checked. If the destination BTS number coincides with the number of the receiving BTS, a switch 48 is closed so that the signal block is supplied to a demultiplexer 50. The source BTS number carried in each signal block being supplied to the demultiplexer 50 is checked in a source BTS number check circuit 52, and in accordance with the result of the check, the demultiplexer 50 is controlled to separate the signal blocks by source BTS number. The signal blocks separated by source BTS number are fed into demultiplexers 52 to recover the control information and traffic information.

Figure 12A:
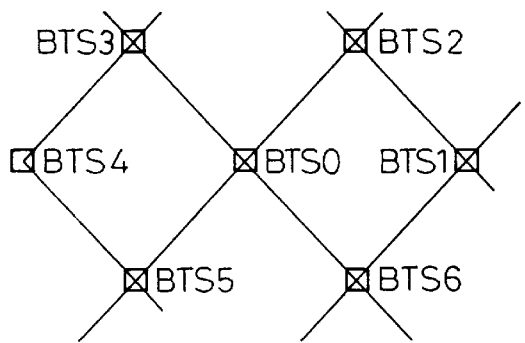
FIGS. 12(a) and 12(b) are diagrams showing one example of connection between adjacent BTSs and information transmission between adjacent BTSs when multiplexing up to two sets of traffic information and control information.
Figure 12B:
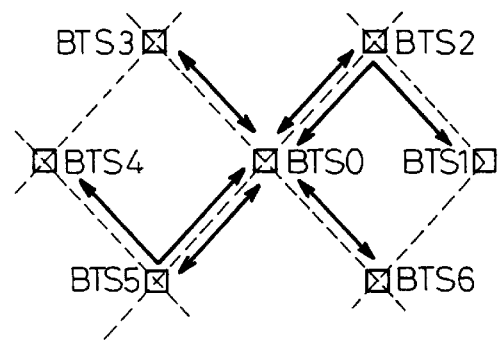
Figure 13A:
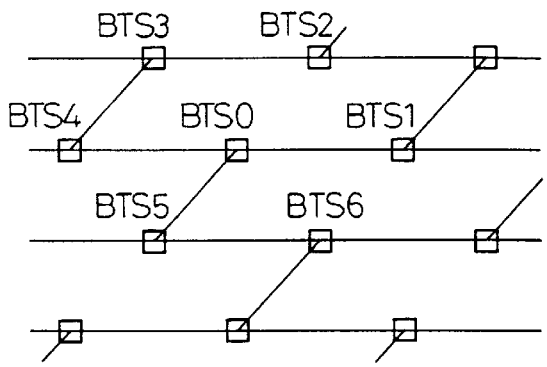
FIGS. 13(a) and 13(b) are diagrams showing one example of connection between adjacent BTSs and information transmission between adjacent BTSs when multiplexing up to three sets of traffic information and control information.
Figure 13B:
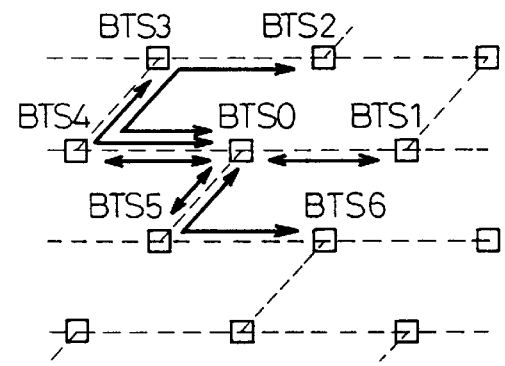
Figure 14A:
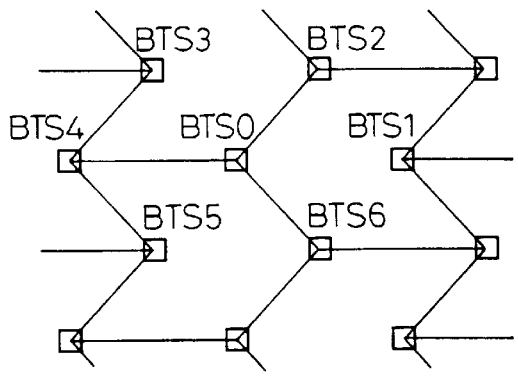
FIGS. 14(a) and 14(b) are diagrams showing another example of connection between adjacent BTSs and information transmission between adjacent BTSs when multiplexing up to three sets of traffic information and control information.
Figure 14B:
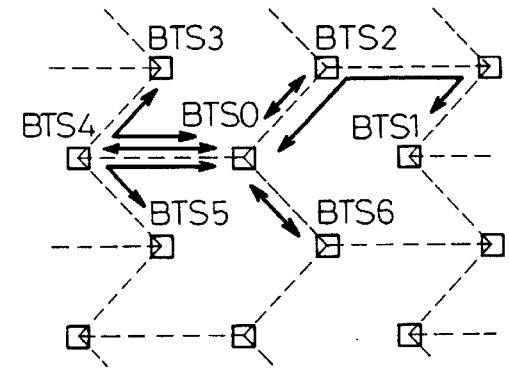

When multiplexing up to two sets of signal blocks different at least in one or the other of the end BTS numbers, then by just laying transmission lines to four adjacent BTSs, as shown in FIG. 12(*a*), control information and traffic information can be transferred to and from the adjacent six BTSs, as shown by thick lines in FIG. 12(*b*). When multiplexing up to three sets of signal blocks, then by just laying transmission lines to three adjacent BTSs, as shown in FIG. 13(*a*) or FIG. 14(*a*), control information and traffic information can be transferred to and from the adjacent six BTSs, as shown in FIGS. 13(*b*) and 14(*b*).

Figure 15:
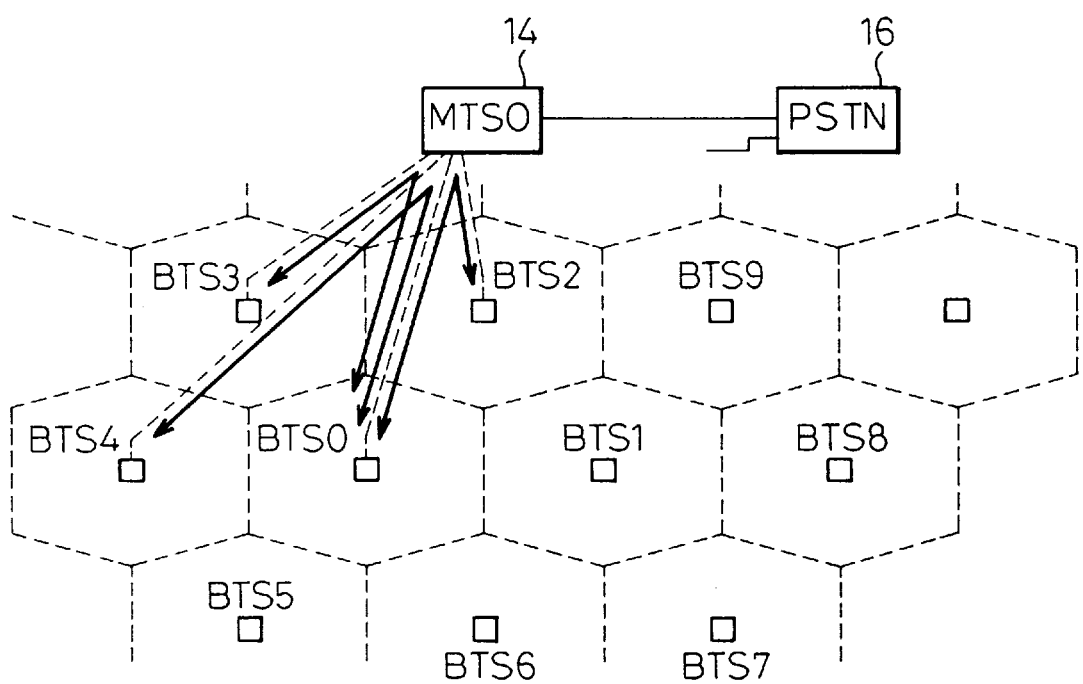
FIG. 15 is a diagram showing information transmission between adjacent BTSs in a further embodiment of the present invention.

FIG. 15 concerns another embodiment of the present invention and shows a configuration where control information and traffic information to be transferred between BTSs are multiplexed on lines connecting to the MTSO. The circuit configuration for multiplexing is the same as that shown in FIG. 11, except that the outgoing line of the transmit/receive select switch 44 is connected to the MTSO, not to adjacent BTSs. Here, it should be noted that the physical lines are routed via the MTSO but logically, the BTSs are directly connected for transfer of the control/traffic information without the intervention of the MTSO. This embodiment eliminates the need for lines between the BTSs served by the same MTSO, but with BTSs served by another MTSO, the same inter-BTS connection as described in the foregoing embodiment becomes necessary.

FIG. 16 shows a configuration for implementing an inter-BTS connection according to still another embodiment of the present invention. While, in the embodiment of FIG. 11, multiplexed signals are sent over wired lines, in the present embodiment the multiplexed signals are transmitted by radio using a radio transceiver 60. The circuit configuration for multiplexing is the same as that shown in FIG. 11. In cellular mobile communications, etc., BTSs are installed at intervals of several kilometers, and there are places where construction of wired lines is difficult. Interconnecting BTSs by radio has the effect of eliminating the need for the construction of wired lines.

FIG. 17 shows a configuration for implementing an inter-BTS connection according to a further embodiment of the present invention. In this embodiment, the control information and traffic information multiplexed by the multiplexers 40 for transmission to adjacent BTSs are multiplexed by a CDXA multiplexer 62 with a signal outgoing to the mobile station (MS) in accordance with the CDMA scheme. The control information and traffic information from each BTS are separated in a CDMA demultiplexer 64 from the incoming signal from the MS. With the CDMA-TDD establishing a radio connection between BTSs and multiplexing it on a radio channel to the MS, there is no need to equip the BTS with additional radio equipment, and an optimum distribution of radio channels becomes possible that matches the amount of traffic between BTSs and between the BTSs and the MS.

FIG. 18 shows a still further embodiment of the present invention. When performing a soft handoff, it is desirable that the BTSs involved be synchronized in radio frequency and timing. Previously, since synchronization between BTSs connected only via an MTSO is difficult to achieve, synchronization means utilizing a GPS system (a position measuring system using satellites, providing means for determining position as well as time) has been used (TIA/EIA/IS-95). The present invention makes use of the configuration interconnecting BTSs, and achieves frequency and timing synchronization between adjacent BTSs by performing control so that frequency and timing errors between them are minimized by using the local synchronization method described in Japanese Unexamined Patent Publication No. 5-63633.

In FIG. 18, a spatial filter 66 applies spatial filtering to a phase difference from a reference phase detected on the control/traffic information received from adjacent BTSs by receiver circuits 70 and 72, and a temporal filter 68 applies temporal filtering to the output of the spatial filter 66. The simplest example of spatial filtering is to take the arithmetic mean of a plurality of phase differences, and the simplest example of temporal filtering is to take the moving average. The output of the temporal filter 68 is used to control the frequency of a voltage-controlled oscillator 70, whose output serves as a reference for the frequency and timing of the signal transmitted to the MS.

According to the present invention, soft handoff control is performed with each BTS transferring control/traffic information to and from each adjacent cell BTS without the intervention of the MTSO. This alleviate the burden of the MTSO, and achieves reductions in system costs and increases reliability.

In the above embodiments, a switching office (the MTSO) is directly connected to the BTSs. In alternative case, the switching office (the MTSO) is connected through a plurality of base station controllers (BSCs) each being connected with a plurality of BTSs, to all of the BTSs. The above descriptions are also applicable to the latter case if the MTSO is replaced by the BSC. An MTSO in the above descriptions or a BSC in the latter case can be called a concentrator.

What is claimed is:

1. In a mobile communication system that includes a concentrator and base transceiver stations connected thereto, a method for carrying out a soft handoff between a mobile station and multiple base transceiver stations, comprising the steps of:

(a) connecting in advance adjacent base transceiver stations via a communication line logically isolated from said concentrator; and
    (b) performing soft handoff control between said mobile station and said multiple base transceiver stations by using said communication line with the control taken by one of said multiple base transceiver stations, step b including the substeps of:
        (i) implementing a transfer from a normal communication mode in which said mobile station is connected only to a first base transceiver station via a radio channel, to a soft handoff mode controlled by said first base transceiver station in which said mobile station is connected also to a second base transceiver station via a radio channel, and in which reverse traffic information received by said second base transceiver station is transferred via said communication line to said first base transceiver station, while forward traffic information received from said concentrator by said first base transceiver station is transferred also to said second base transceiver station via said communication line;
        (ii) implementing a transfer from the soft handoff mode controlled by said first base transceiver station to a soft handoff mode controlled by said second base transceiver station; and
        (iii) implementing a transfer from the soft handoff mode controlled by said second base transceiver station to a normal communication mode in which said mobile station is connected only to said second base transceiver station via said radio channel.

2. A method according to claim 1, wherein said substep (i) includes the substeps of:

sending a connection request from said first base transceiver station to said second transceiver station via said communication line for connection to said mobile station; and
    implementing the transfer to the soft handoff mode controlled by said first base transceiver station when said connection request is accepted by said second base transceiver station, said substep (ii) includes the substeps of:

sending a hard handoff request from said first base transceiver station to said concentrator; and
    implementing the transfer from the soft handoff mode controlled by said first base transceiver station to the soft handoff mode controlled by said second base transceiver station in accordance with a hard handoff command that said concentrator issues to said first and second base transceiver stations in response to said hard handoff request, and wherein:
        in said substep (iii), a soft handoff mode clear instruction is sent from said second base transceiver station to said first base transceiver station via said communication line.

3. A method according to claim 1, wherein said communication line is implemented by a transmission line independently laid between said adjacent base transceiver stations.

4. A method according to claim 1, wherein a plurality of communication lines are multiplexed on a transmission line laid between said base transceiver stations.

5. A method according to claim 1, wherein said communication line is multiplexed on transmission lines connecting between said concentrator and said base transceiver stations.

6. A method according to claim 1, wherein said communication line is implemented by a radio channel.

7. A method according to claim 6, wherein said radio channel implementing said communication line is code-division multiplexed on a radio channel to said mobile station.

8. A method according to claim 1, further comprising the step of:

(c) controlling the frequency and phase of a signal for transmission to said mobile station on the basis of the frequency and phase of a signal received via said communication line from the other adjacent base transceiver station.

9. A mobile communication system comprising:

a concentrator;

base transceiver stations connected to said concentrator;

a communication line, logically isolated from said concentrator, for connecting between adjacent base transceiver stations; and means, provided in each of said base transceiver stations, for performing soft handoff control between said mobile station and multiple base transceiver stations by using said communication line with the control taken by one of said multiple base transceiver stations, wherein said soft handoff control performing means includes:

first mode-transfer implementing means for implementing a transfer from a normal communication mode in which said mobile station is connected only to a first base transceiver station via a radio channel, to a soft handoff mode controlled by said first base transceiver station in which said mobile station is connected also to a second base transceiver station via a radio channel, and in which reverse traffic information received by said second base transceiver station is transferred via said communication line to said first base transceiver station, while forward traffic information received from said concentrator by said first base transceiver station is transferred also to said second base transceiver station via said communication line;

second mode-transfer implementing means for implementing a transfer from the soft handoff mode controlled by said first base transceiver station to a soft handoff mode controlled by said second base transceiver station; and third mode-transfer implementing means for implementing a transfer from the soft handoff mode controlled by said second base transceiver station to a normal communication mode in which said mobile station is connected only to said second base transceiver station via said radio channel.

10. A system according to claim 8, wherein said first mode-transfer implementing means includes:

means for sending a connection request from said first base transceiver station to said second transceiver station via said communication line for connection to said mobile station; and means for implementing the transfer to the soft handoff mode controlled by said first base transceiver station when said connection request is accepted by said second base transceiver station, said second mode-transfer implementing means includes:

means for sending a hard handoff request from said first base transceiver station to said concentrator; and means for implementing the transfer from the soft handoff mode controlled by said first base transceiver station to the soft handoff mode controlled by said second base transceiver station in accordance with a hard handoff command that said concentrator issues to said first and second base transceiver stations in response to said hard handoff request, and wherein:

said third mode-transfer implementing means sends a soft handoff mode clear instruction from said second base transceiver station to said first base transceiver station via said communication line.

11. A system according to claim 9, wherein said communication line is implemented by a transmission line independently laid between said adjacent base transceiver stations.

12. A system according to claim 9, wherein a plurality of communication lines are multiplexed on a transmission line laid between said base transceiver stations.

13. A system according to claim 9, wherein said communication line is multiplexed on transmission lines connecting between said concentrator and said base transceiver stations.

14. A system according to claim 9, wherein said communication line is implemented by a radio channel.

15. A system according to claim 14, wherein said radio channel implementing said communication line is code-division multiplexed on a radio channel to said mobile station.

16. A system according to claim 9, further comprising means for controlling the frequency and phase of a signal for transmission to said mobile station on the basis of the frequency and phase of a signal received via said communication line from the other adjacent base transceiver station.

17. A base transceiver station for a mobile communication system that includes a concentrator and base transceiver stations connected thereto, comprising:

means for communicating with adjacent base transceiver stations via a communication line logically isolated from said concentrator; and means for performing soft handoff control between a mobile station and multiple base transceiver stations by using said communication line with the control taken by one of said multiple base transceiver stations, wherein said soft handoff control performing means includes:

first mode-transfer implementing means for implementing a transfer from a normal communication mode in which said mobile station is connected only to a first base transceiver station via a radio channel, to a soft handoff mode controlled by said first base transceiver station in which said mobile station is connected also to a second base transceiver station via a radio channel, and in which reverse traffic information received by said second base transceiver station is transferred via said communication line to said first base transceiver station, while forward traffic information received from said concentrator by said first base transceiver station is transferred also to said second base transceiver station via said communication line;

second mode-transfer implementing means for implementing a transfer from the soft handoff mode controlled by said first base transceiver station to a soft handoff mode controlled by said second base transceiver station; and third mode-transfer implementing means for implementing a transfer from the soft handoff mode controlled by said second base transceiver station to a normal communication mode in which said mobile station is connected only to said second base transceiver station via said radio channel.

18. A base transceiver station according to claim 17, wherein said first mode-transfer implementing means includes:

means for sending a connection request from said first base transceiver station to said second transceiver station via said communication line for connection to said mobile station; and means for implementing the transfer to the soft handoff mode controlled by said first base transceiver station when said connection request is accepted by said second base transceiver station, said second mode-transfer implementing means includes:

means for sending a hard handoff request from said first base transceiver station to said concentrator; and means for implementing the transfer from the soft handoff mode controlled by said first base transceiver station to the soft handoff mode controlled by said second base transceiver station in accordance with a hard handoff command that said concentrator issues to said first and second base transceiver stations in response to said hard handoff request, and wherein:

said third mode-transfer implementing means sends a soft handoff mode clear instruction from said second base transceiver station to said first base transceiver station via said communication line.

19. A base transceiver station according to claim 17, wherein said communication line is implemented by a transmission line independently laid between said adjacent base transceiver stations.

20. A base transceiver station according to claim 17, wherein a plurality of communication lines are multiplexed on a transmission line laid between said base transceiver stations.

21. A base transceiver station according to claim 17, wherein said communication line is multiplexed on transmission lines connecting between said concentrator and said base transceiver stations.

22. A base transceiver station according to claim 17, wherein said communication line is implemented by a radio channel.

23. A base transceiver station according to claim 22, wherein said radio channel implementing said communication line is code-division multiplexed on a radio channel to said mobile station.

24. A base transceiver station according to claim 17, further comprising means for controlling the frequency and phase of a signal for transmission to said mobile station on the basis of the frequency and phase of a signal received via said communication line from the other adjacent base transceiver station.

* * * * *